US012126962B2

(12) United States Patent
Burwinkel

(10) Patent No.: US 12,126,962 B2
(45) Date of Patent: Oct. 22, 2024

(54) HEARING ASSISTANCE SYSTEM WITH AUTOMATIC HEARING LOOP MEMORY

(71) Applicant: Starkey Laboratories, Inc., Eden Prairie, MN (US)

(72) Inventor: Justin R. Burwinkel, Eden Prairie, MN (US)

(73) Assignee: Starkey Laboratories, Inc., Eden Prairie, MN (US)

(*) Notice: Subject to any disclaimer, the term of this patent is extended or adjusted under 35 U.S.C. 154(b) by 240 days.

(21) Appl. No.: 17/754,833

(22) PCT Filed: Oct. 14, 2020

(86) PCT No.: PCT/US2020/070667

§ 371 (c)(1), (2) Date: Apr. 13, 2022

(87) PCT Pub. No.: WO2021/077135

PCT Pub. Date: Apr. 22, 2021

(65) Prior Publication Data

US 2023/0247373 A1 Aug. 3, 2023

Related U.S. Application Data

(60) Provisional application No. 62/914,771, filed on Oct. 14, 2019.

(51) Int. Cl.
*H04R 25/00* (2006.01)

(52) U.S. Cl.
CPC ........... *H04R 25/43* (2013.01); *H04R 25/554* (2013.01); *H04R 2225/61* (2013.01); *H04R 2460/11* (2013.01)

(58) Field of Classification Search
CPC .. H04R 25/43; H04R 25/554; H04R 2225/61; H04R 2460/11
See application file for complete search history.

(56) References Cited

U.S. PATENT DOCUMENTS 7,248,713 B2 7/2007 Bren et al.
8,923,543 B2 * 12/2014 Sacha .................. H04R 25/456 381/328

(Continued)

FOREIGN PATENT DOCUMENTS

EP 2804401 A1 11/2014
WO WO-2021077135 A1 4/2021

OTHER PUBLICATIONS

Crystal, Carr , "A Magnetic Sensor for Hearing Aid Application", 2012 (Year: 2012).*

(Continued)

*Primary Examiner* — Sunita Joshi
(74) *Attorney, Agent, or Firm* — Schwegman Lundberg & Woessner, P.A.

(57) ABSTRACT

Disclosed herein, among other things, are apparatus and methods for an automatic hearing loop memory for hearing assistance systems. A method includes receiving an acoustic input at a microphone and receiving an inductive input at a magnetic sensor. The method further includes using an operatively connected processor of the hearing assistance system to process the acoustic input from the microphone using instructions stored in a first set of memory locations, and to process the inductive input from the magnetic sensor using instructions stored in a second set of memory locations, and to optionally discontinue processing the acoustic input when a demodulator circuit operatively connected to the processor detects a predetermined signal indicative of the presence of a hearing loop system.

23 Claims, 3 Drawing Sheets

(56) References Cited

U.S. PATENT DOCUMENTS

| | | | | |
|---|---|---|---|---|
| 2003/0059076 | A1 | 3/2003 | Martin | |
| 2003/0152243 | A1 | 8/2003 | Julstrom et al. | |
| 2004/0052391 | A1 | 3/2004 | Bren et al. | |
| 2004/0252855 | A1 | 12/2004 | Vasserman et al. | |
| 2006/0109994 | A1 | 5/2006 | Husung et al. | |
| 2013/0343584 | A1* | 12/2013 | Bennett | A61J 1/00 381/317 |

OTHER PUBLICATIONS

Carr, Crystal, "A Magnetic Sensor for Hearing Aid Application." (Year: 2012).*

"International Application Serial No. PCT/US2020/070667, International Search Report mailed Jan. 20, 2021", 4 pgs.

"International Application Serial No. PCT/US2020/070667, Written Opinion mailed Jan. 20, 2021", 6 pgs.

* cited by examiner

HEARING ASSISTANCE SYSTEM WITH AUTOMATIC HEARING LOOP MEMORY

CLAIM OF PRIORITY

This patent application is a U.S. National Stage Filing under 35 U.S.C. 371 from International Application No. PCT/US2020/070667, filed on Oct. 14, 2020, and published as WO 2021/077135, which claims the benefit of U.S. Provisional Patent Application No. 62/914,771, filed Oct. 14, 2019, which is incorporated by reference herein in its entirety.

TECHNICAL FIELD

This document relates generally to hearing assistance systems and more particularly to an automatic hearing loop memory for hearing assistance device applications.

BACKGROUND

Hearing assistance devices, such as hearing aids, are used to assist patients suffering hearing loss by transmitting amplified sounds to ear canals. In one example, a hearing aid is worn in and/or around a patient's ear. Generally, hearing aids are small and require extensive design to fit all the necessary electronic components into the hearing aid or attached to the hearing aid. In normal operation, a hearing aid processes an acoustic input to a microphone of the hearing aid to assist wearers suffering from hearing loss. Hearing aids may provide adjustable operational modes or characteristics that improve the performance of the hearing aid for a specific person or in a specific environment.

Hearing loops are an assistive listening technology that provides hearing aids with a direct audio input from a sound source without the use of the microphone of the hearing aid. The telecoil feature, which has historically been included in most hearing aids, allows the hearing aid user, as well as Assistive Listening Device (ALD) users, to access wireless audio transmission via induction hearing loop systems with relatively low power consumption. Telecoil induction hearing loop systems are also advantageous in that they offer end users convenient, reliable, inconspicuous, and hygienic means of accessing wireless audio with an advantageous Signal to Noise Ratio (SNR) beyond that of typical hearing aid use. Places where hearing loops are available are required by the Americans with Disabilities Act (and the like) to be labeled with a sign which indicates the presence of the hearing loop system. However, a user may fail to see or recognize the sign or otherwise have difficulty switching into hearing loop memory (i.e. switching the device input to hearing loop mode). Furthermore, changes in telecoil sensitivity that occur with shifts in wearer's head position are a primary complaint of induction hearing loop users.

Thus, there is a need in the art for an improved hearing loop switching system for hearing assistance device applications.

SUMMARY

Disclosed herein, among other things, are apparatus and methods for an automatic hearing loop memory for a hearing assistance system. A hearing assistance system includes a microphone configured to receive an acoustic input, a magnetic sensor configured to receive an inductive input, a memory, and a processor operatively connected to the microphone, the magnetic sensor, and the memory. The processor is configured to process the acoustic input from the microphone using instructions stored in a first set of memory locations and further configured to process the inductive input from the magnetic sensor using instructions stored in a second set of memory locations. The hearing assistance system further includes a demodulator circuit operatively connected to the processor, the demodulator circuit configured to detect a predetermined signal embedded in one or more of the acoustic input or the inductive input. The processor is configured to switch from using instructions stored in the first set of memory locations to using instructions stored in the second set of memory locations when the demodulator circuit detects the predetermined signal.

Various aspects of the present subject matter include a method of using a hearing assistance system. The method includes receiving an acoustic input at a microphone and receiving an inductive input at a magnetic sensor. The method further includes using an operatively connected processor of the hearing assistance device to process the acoustic input from the microphone using instructions stored in a first set of memory locations. The method also includes using the processor to process the inductive input from the magnetic sensor using instructions stored in a second set of memory locations, and to optionally discontinue processing the acoustic input when a demodulator circuit operatively connected to the processor detects a predetermined signal embedded in one or more of the acoustic input or the inductive input, the predetermined signal indicative of the presence of a hearing loop system.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION

Figure 1:
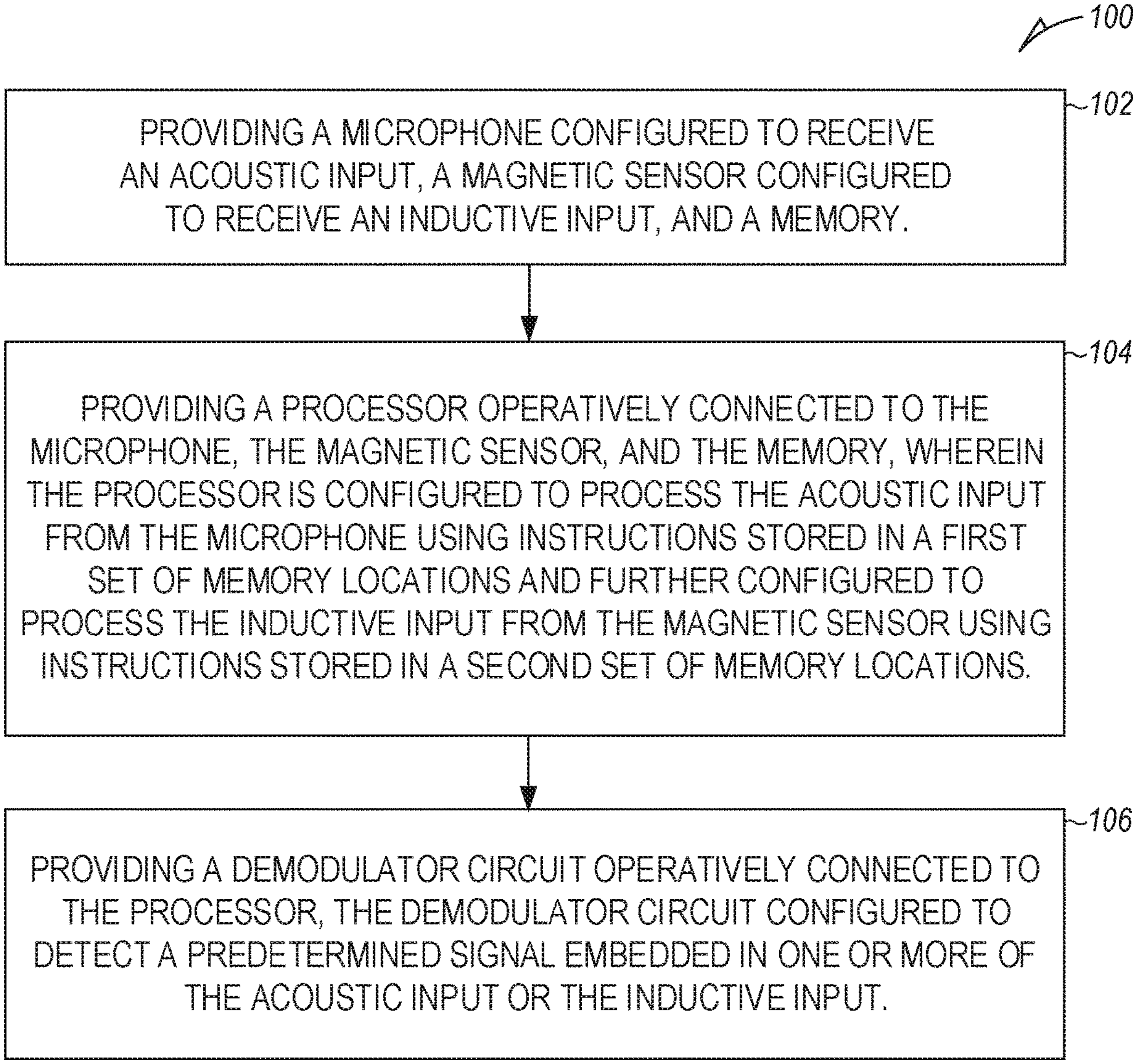
FIG. 1 illustrates a flow diagram of a method of making a hearing assistance device with an automatic hearing loop memory, according to various embodiments of the present subject matter.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present detailed description will discuss hearing assistance devices using the example of hearing aids. Other hearing assistance devices include, but are not limited to, cochlear implants, osseointegrated hearing devices, and those referred to in this document. It is understood that their use in the description is intended to demonstrate the present subject matter, but not in a limited or exclusive or exhaustive sense.

A hearing loop is an assistive listening technology that provides hearing aids with a direct audio input from a sound source without use of microphones of the hearing aids. In locations where hearing loops are available, regulations such as the Americans with Disabilities Act (ADA) commonly prescribe a display of signage to indicate the presence of the hearing loop. However, a hearing aid wearer may fail to see or recognize the sign or otherwise have difficulty switching a processor of the hearing aid into memory locations storing instructions for using the hearing loop function of the hearing aid (i.e., the hearing loop memory). Due to possible noise from powerlines and other electromagnetic ambient sources, it is not ideal to have a hearing aid provide the user with audio received from a telecoil function during all scenarios of operation. The present subject matter provides for automatically switching to a hearing loop memory/telecoil function. In addition, the present subject matter provides for similar overall loudness level of the telecoil function when compared to the microphone function of the hearing aid when using the hearing loop memory.

A hearing aid wearer may not know of the existence of an available hearing loop or may otherwise forget that a hearing loop is available, and therefore may not switch their hearing aids into the most appropriate setting for the environment. In addition, not all hearing devices include a user control and some patients have dexterity limitations that could otherwise prevent the user from making manual memory switches for normal microphone mode to hearing loop mode. The microphone and telecoil responses of a hearing device may not be transparent (or provide equivalent amounts of gain in these modes) for a variety of reasons, including poor programming, lack of verification measures, component variances, debris in the microphone, device orientation or posture of the wearer, and the like. The present subject matter systems and methods for automatically switching to and adjusting parameters of a hearing loop memory for a hearing device user.

Current hearing aids are able to switch to a telecoil memory setting when a nearby phone is detected. However, this type of functionality has not been used to automatically switch a hearing aid into hearing loop memory setting due to technical constraints. The magnetic field strength of a telephone receiver is significantly greater than that of a hearing loop designed to meet the IEC 601184 standard. As such, the magnetic sensor, such as a giant magnetoresistance sensor (GMR), that is used to detect when a phone is present is not set to the sensitive enough to detect the magnetic field of a hearing loop. In addition, increasing the GMR sensitivity would cause the memory switch to occur (errantly) when the device user was too close to other electrical wires or electromagnetic sources and thus would lead to many false-positive switches.

To correct for these deficiencies, the present subject matter provides a hearing system with an operatively connected demodulator circuit capable of detecting specific codes, signatures, and/or modulations embedded in a hearing loop signal, in various embodiments. According to various embodiments, the modulated signal could be introduced into the hearing loop signal at a frequency or amplitude shift amount that is selected to be less than the human just-noticeable-difference or below typical human hearing thresholds. The modulation signal may be introduced by a hearing loop driver, or by a separate device that passes the audio signal (input or output) through the device with the added modulation signal embedded, in various embodiments. In some embodiments, the modulation may be speech modulation wherein the hearing system monitors the telecoil input for signals that resemble human speech or music. In some embodiments a neckloop receiver device is used, where a hearing loop is produced around the neck of the wearer. In this and other embodiments, an acoustically modulated signal could be used to alert the nearby hearing instrument to the presence of the neck loop.

FIG. 1 illustrates a flow diagram of a method 100 of making a hearing assistance device with an automatic hearing loop memory, according to various embodiments of the present subject matter. The method 100 including providing a microphone configured to receive an acoustic input, a magnetic sensor configured to receive an inductive input, and a memory, at step 102. The method 100 further includes providing a processor operatively connected to the microphone, the magnetic sensor, and the memory, at step 104. The processor is configured to process the acoustic input from the microphone using instructions stored in a first set of memory locations and further configured to process the inductive input from the magnetic sensor using instructions stored in a second set of memory locations. The method 100 further includes providing a demodulator circuit connected to the processor at step 106, the demodulator circuit configured to detect a predetermined signal embedded in one or more of the acoustic input or the inductive input. The processor is configured to switch from using instructions stored in the first set of memory locations to using instructions stored in the second set of memory locations when the demodulator circuit detects the predetermined signal, in various embodiments. In various embodiments, the predetermined signal includes one or more of a code, a key, a pattern, a digital signature, a modulated signal, a characteristic of speech, or the like.

Figure 2:
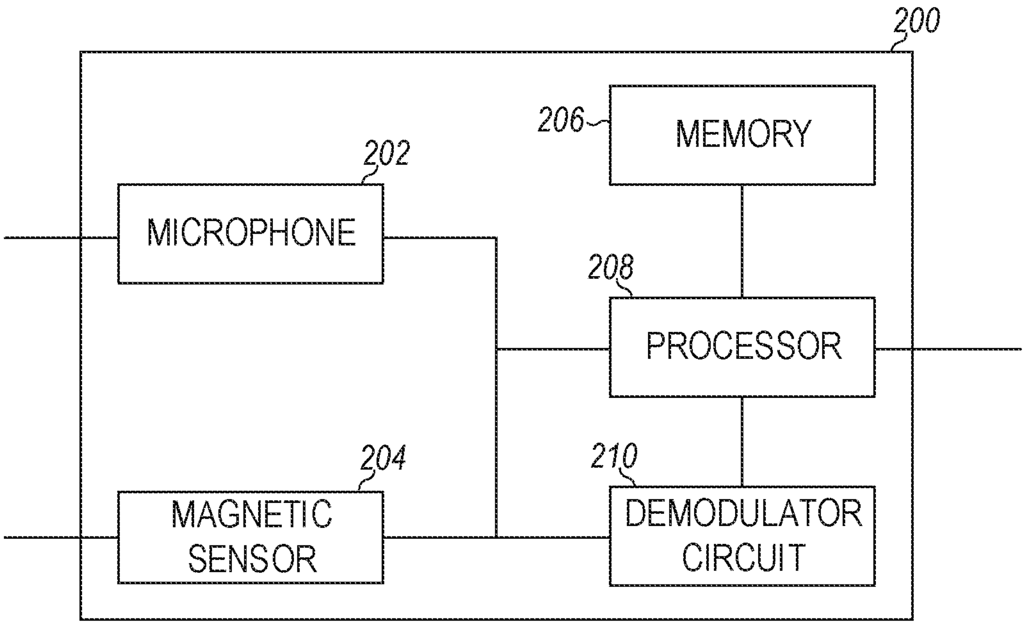
FIG. 2 illustrates a block diagram of a hearing assistance system with an automatic hearing loop memory, according to various embodiments of the present subject matter.

FIG. 2 illustrates a block diagram of a hearing assistance system with an automatic hearing loop memory, according to various embodiments of the present subject matter. The hearing assistance system 200 includes a microphone 202 configured to receive an acoustic input, a magnetic sensor 204 configured to receive an inductive input, a memory 206, and a processor 208 operatively connected to the microphone 202, the magnetic sensor 204, and the memory 206. The processor 208 is configured to process the acoustic input from the microphone 202 using instructions stored in a first set of memory locations and further configured to process the inductive input from the magnetic sensor 204 using instructions stored in a second set of memory locations. The hearing assistance system 200 further includes a demodulator circuit 210 operatively connected to the processor 208, the demodulator circuit 210 configured to detect a predetermined signal embedded in one or more of the acoustic input or the inductive input. The processor 208 is configured to switch from using instructions stored in the first set of memory locations to using instructions stored in the second set of memory locations when the demodulator circuit 210 detects the predetermined signal, according to various embodiments.

According to various embodiments, the predetermined signal may be received from a hearing loop system. In some embodiments, the predetermined signal may be received from a beacon device placed near an entry way or within the hearing loop space, such as a wireless beacon, acoustic beacon, infrared beacon or magnetic beacon. Other types of beacon devices may be used without departing from the scope of the present subject matter. The predetermined signal may include one or more of a code, a key, a pattern, a digital signature, a modulated signal, a characteristic of speech, or a characteristic of music, in various embodiments. In some embodiments, the characteristic of speech may include a speech envelope, phoneme detection, speech formants, or the like. The predetermined signal may be embedded into an audio signal, embedded into an inductive signal, or may be embedded into an out-of-band signal, in various embodiments. In some embodiments, the predetermined signal may include a signal at a frequency or amplitude outside a range of human hearing. The demodulator circuit may be configured to periodically attempt to detect the predetermined signal embedded in the inductive input, to reduce power and preserve system resources, in some embodiments. In various embodiments, the demodulator circuit may be configured to temporarily switch off the microphone and switch on the telecoil to detect the predetermined signal. The system includes wirelessly-linked left and right hearing devices, in some embodiments. The system is configured to duty cycle between the wirelessly linked left and right hearing devices to attempt to detect the predetermined signal, in various embodiments. In various embodiments, the wirelessly-linked left and right hearing devices are configured to make coordinated adjustments to one or more hearing assistance parameters for consistent user experience. According to various embodiments, the hearing assistance system is in communication with a smartphone of a user of the hearing assistance system, and at least some processing of the system is offloaded to a processor of the smartphone. The magnetic sensor may include one or more of a telecoil, a giant magnetoresistance (GMR) sensor, or a tunnel magnetoresistance (TMR) sensor, in various embodiments.

According to various embodiments, the hearing assistance system includes a hearing assistance device. In some embodiments, the hearing assistance device may be a hearing aid, including one or more of a behind-the-ear (BTE) hearing aid, an on-the-ear (OTE) hearing aid, an in-the-ear (ITE) hearing aid, a completely-in-the-canal (CIC) hearing aid, or a receiver-in-canal (RIC) hearing aid. The hearing assistance device may be a cochlear implant or osseointegrated hearing device, in various embodiments.

In some cases, the user or wearer may not want to access the hearing loop or may want to temporarily remove themselves from the loop (e.g., to have a side conversation with someone). In various embodiments, the user may use any suitable user control on the hearing device (e.g., tap using an inertial measurement unit (IMU) sensor, or voice control, or physical button press) or head gesture (sensed by the IMU sensor) or a using a device in communication with the hearing device (e.g., the user's smartphone, such as by using a voice control or touchscreen input) and the like to stop or switch out of the hearing loop memory. If the user cancels the automatic switch, then a timer could be initiated such that the hearing devices will not automatically return to the hearing loop memory within a programmable amount of time (e.g. for the next few hours, etc.). In various embodiments, the user may then use a control to restart the hearing loop memory (e.g., tap to stop, have side-conversation, tap to start again, etc.). In some embodiments, the system may use any suitable machine learning technique to determine locations, times, or other conditions or contexts where the user does not want to use the automatic loop setting.

The present subject matter may be used in a manner for power and/or resource management, in some embodiments. For example, the hearing system may only periodically or intermittently analyze the inductive input for the presence of the predetermined code, thus saving computational resources, input bus traffic, power usage, and other system resources. In some embodiments, the system may temporarily switch the microphone input "off" and the induction input "on" for a time period to allow the system to perform this analysis. The time period may be such that the user does not notice, or this may be strategically performed during time periods in which the system is not providing the user with processed audio output, such as quiet periods when noise reduction is already suppressing the microphone input of the hearing system, according to various embodiments. It will also be appreciated that, in various embodiments, the system may not be providing the user with a processed audio output during wireless audio streams that utilize a wireless radio, such as a 2.4 GHz or 900 MHz radio.

Acoustic transparency between memory settings is important to user satisfaction when listening to a hearing loop signal. For example, if a user switches from their normal hearing aid memory setting to a telecoil setting that is set too low, the user may believe that the hearing loop is not helpful or not working. Similarly, if the setting is too loud, then the user may think that the hearing loop is too noisy or uncomfortable to listen to. Ideally, the listening level of a signal when using the hearing loop should be equivalent to the listening level of a signal when listening to the sound source when using the microphone input of the hearing device. In various embodiments, the hearing loop signal may be normalized to be equivalent to match a signal input from the microphone. In some embodiments, the hearing loop signal may be equivalent or similar to the signal input from the microphone once a predetermined offset is applied. For example, in specific frequency ranges, the present subject matter can provide clarity in noisy situations by targeting harmonics in specific frequency ranges of a speaker's voice and providing an equivalent loudness between hearing loop and microphone settings.

These responses are usually matched by hearing device manufacturers, but gain settings can be adjusted for each memory independently. Moreover, the input signal from a telecoil in a hearing loop may be affected by the orientation of the hearing device and thus the telecoil inside the hearing device. For example, if 45 degrees from an optimal position results in a 3 dB lower input, 60 degrees results in a 6 dB lower input, and thus 60 degrees can make the signal almost nil. These positional effects are exacerbated by telecoil positioning within the hearing device, since the telecoil is often at an angle inside the hearing aid by 15-45 degrees. In an extreme case, a user could tilt their head 30 degrees, but effectively have their telecoil 75 degrees from the optimal position. As an additional benefit, providing automated telecoil input corrections may allow for additional flexibility when designing or building a hearing device.

The present subject matter provides for corrective measures capable of assistance a user or wearer in correcting these orientation issues. In one embodiment, an embedded IMU sensor is used to calculate the present orientation of the hearing device and adaptively apply a correction factor to one or more of the hearing loop memory's gain, frequency shaping, or compressor attributes. In another embodiment, a microphone input is a reference for telecoil input. Often, loudspeakers are used where hearing loops are present, and the loudspeaker is played at a comfortable listening volume for normal hearing individuals, so the acoustic level provided by the loudspeaker can be used as a reference for speech loudness. In some embodiments, the hearing loop memory may effectively equalize between the hearing loop input and the received loudspeaker level. Since hearing loops are often used in highly reverberant locations, the hearing system may use any suitable form of signal processing to evaluate the loudness level of the target signal while rejecting echoes or reflections of the target signal. In various embodiments, when signal strength weakens below a threshold or the IMU sensor detects head tilt beyond a certain level, the hearing device can be configured to provide instructions to the user to correct for the orientation. For example, the user may receive an audible message from one or more of the hearing devices worn by the user to "tilt your head upward to improve your listening experience." In some embodiments, the magnetic sensor and microphone signals can be mixed differentially based upon device orientation, for example by increasing an amount of microphone input as magnetic sensor input drops due to device orientation or distance from a source.

In various embodiments, the inductive input may be used in signal processing to inform speech enhancement features. For example, when a user listens using their acoustic microphone settings (such that the output sounds consistent with the user's typical listening experiences), the speech enhancement features applied to the acoustic microphone input may be informed by a segregated sound source with less noise, competing speech, and/or non-target speech. A speech enhancement feature may selectively amplify fricative phonemes of a target individual speaking, where the inductive signal provides a clean representation of at least one speaker and may be used to improve the accuracy of the phoneme detection and classification, and thus enhancement thereof, in some embodiments.

Figure 3:
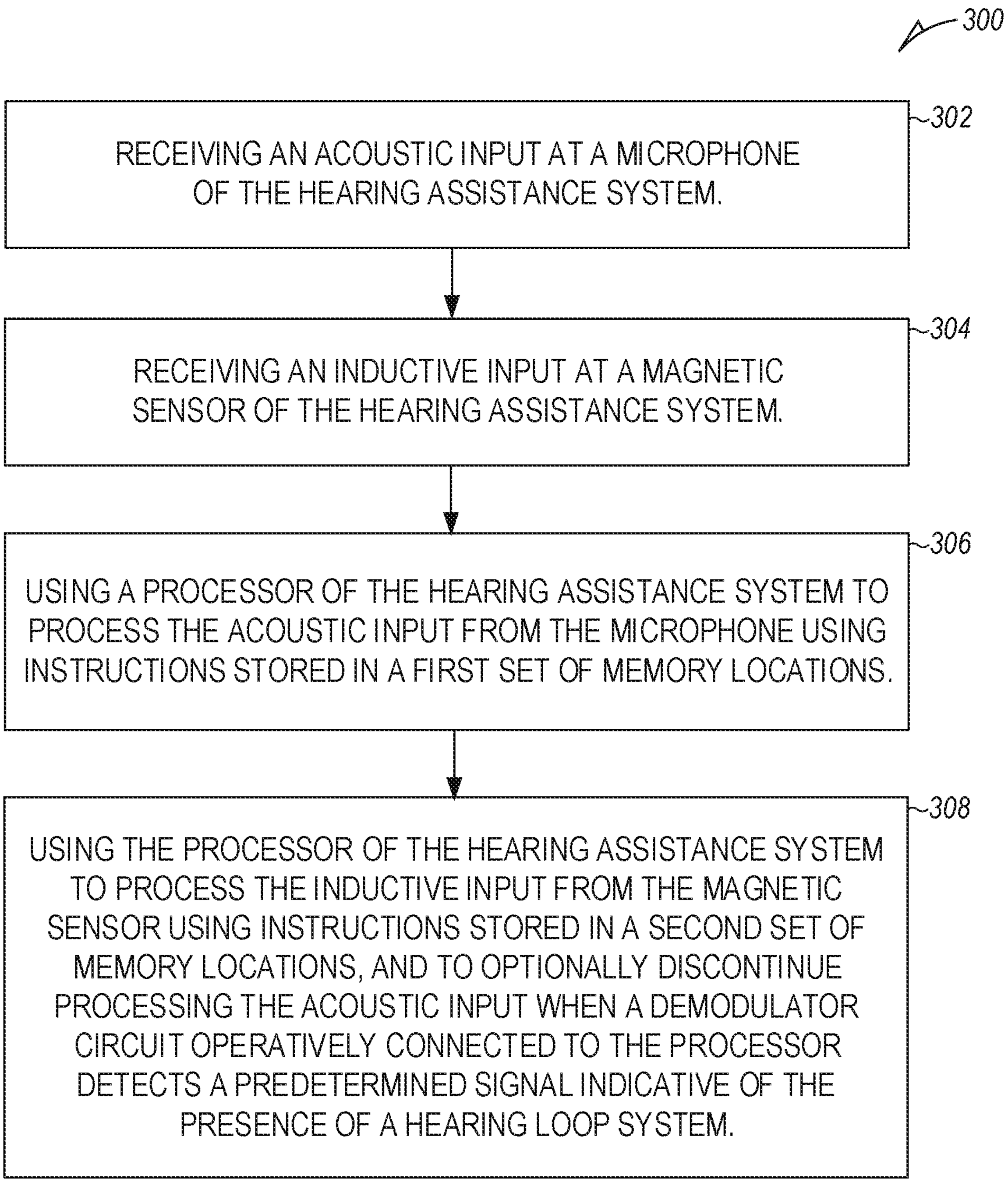
FIG. 3 illustrates a flow diagram of a method of using a hearing assistance system with an automatic hearing loop memory, according to various embodiments of the present subject matter.

FIG. 3 illustrates a flow diagram of a method 300 of using a hearing assistance system with an automatic hearing loop memory, according to various embodiments of the present subject matter. The method 300 includes receiving an acoustic input at a microphone, at step 302, and receiving an inductive input at a magnetic sensor, at step 304. At step 306, the method 300 further includes using a processor of the hearing assistance system to process the acoustic input from the microphone using instructions stored in a first set of memory locations. The method 300 also includes using the processor of the hearing assistance system to process the inductive input from the magnetic sensor using instructions stored in a second set of memory locations and to optionally discontinue processing the acoustic input when a demodulator circuit connected to the processor detects a predetermined signal indicative of the presence of a hearing loop system, at step 308.

According to various embodiments, the method further includes sensing a user input, and upon sensing the user input, switching from processing the inductive input using instructions stored in the second set of memory locations to processing the acoustic input using instructions stored in the first set of memory locations. The user input is received using a manual switch on a housing of a device of the hearing assistance system, in various embodiments. The user input is received as a gesture input from a wearer of a device of the hearing assistance system, in some embodiments. According to various embodiments, the method further includes using a global positioning system (GPS) to determine whether the hearing assistance system is proximate a hearing loop system, and switching from processing the acoustic input using instructions stored in the first set of memory locations to processing the inductive input using instructions stored in the second set of memory locations based on the determination. The method also includes using a machine learning system to determine whether the hearing assistance system is proximate the hearing loop system, in various embodiments. In some embodiments, the method uses crowd-sourcing data, such as from a cloud infrastructure or mesh network, to make this type of determination. The method pulls data from a database to determine where hearing loop systems are known to exist, in some embodiments.

In some embodiments, the method may further include determining an orientation of a device of the hearing assistance system using an inertial measurement unit (IMU) sensor, and providing a message to a wearer of the device directing the wearer to change the orientation of the device in a prescribed manner to improve reception of the inductive input. The method may further include determining statistics related to loudness of one or more of an input signal or an output signal of the hearing assistance system, and adjusting parameters of the hearing assistance system when processing the inductive input from the telecoil to match the determined statistics, in various embodiments. Parameters to be adjusted may include amplification parameters, gain, frequency shaping, compression characteristics, or the like. In some embodiments, determining the statistics related to loudness may include targeting formants or harmonics of a voice of a speaker in an acoustic environment of the wearer. It will also be appreciated that music or other sounds may be relevant to a user. Thus, in various embodiments the statistics may be related to the loudness of music or other sounds, accordingly. In various embodiments, the system and method of the present subject matter may 'listen to' other forms of assistive listening audio streaming such as Bluetooth or frequency modulation (FM) and switch the hearing aids into a playback setting when speech, music content, and the like are detected.

In various embodiments, when automatically switching into the hearing loop program in memory, the hearing devices may also activate an auto-vent feature that will actively close off the vent of the hearing aid to provide greater acoustic separation between what is be played in the ear canal from the ambient sounds external to the ear coupling. The auto-vent also has other advantages that would be desirable when listening to in a hearing loop setting. Examples of auto-vent features include, but are not limited to, those found in commonly-owned U.S. patent application Ser. No. 13/720,793 (now issued as U.S. Pat. No. 8,923,543), entitled HEARING ASSISTANCE DEVICE VENT VALVE, and commonly-owned U.S. Provisional Patent Application No. 62/850,805, entitled SOLENOID ACTUATOR IN A HEARING DEVICE, both of which are hereby incorporated by reference herein in their entirety.

The present subject matter provides several benefits, including providing a user or wearer of a hearing device with a seamless and automated user experience. Accessing hearing loop signals can help insure that the user is receiving the best available speech signal in a difficult listening situation.

Various embodiments of the present subject matter support wireless communications with a hearing assistance device. In various embodiments the wireless communications may include standard or nonstandard communications. Some examples of standard wireless communications include link protocols including, but not limited to, Bluetooth™, Bluetooth™ Low Energy (BLE), IEEE 802.11 (wireless LANs), 802.15 (WPANs), 802.16 (WiMAX), cellular protocols including, but not limited to CDMA and GSM, ZigBee, and ultra-wideband (UWB) technologies. Such protocols support radio frequency communications and some support infrared communications. Other forms of wireless communications may be used such as ultrasonic, optical, infrared, and others. It is understood that the standards which may be used include past and present standards. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, SPI, PCM, ATM, Fibre-channel, Firewire or 1394, InfiniBand, or a native streaming interface. In various embodiments, such connections include all past and present link protocols. It is also contemplated that future versions of these protocols and new future standards may be employed without departing from the scope of the present subject matter.

Hearing assistance devices typically include at least one enclosure or housing, a microphone, hearing assistance device electronics including processing electronics, and a speaker or "receiver." Hearing assistance devices may include a power source, such as a battery. In various embodiments, the battery is rechargeable. In various embodiments multiple energy sources are employed. It is understood that in various embodiments the microphone is optional. It is understood that in various embodiments the receiver is optional. It is understood that variations in communications protocols, antenna configurations, and combinations of components may be employed without departing from the scope of the present subject matter. Antenna configurations may vary and may be included within an enclosure for the electronics or be external to an enclosure for the electronics. Thus, the examples set forth herein are intended to be demonstrative and not a limiting or exhaustive depiction of variations.

It is understood that digital hearing assistance devices include at least one processor. In digital hearing assistance devices with a processor, programmable gains may be employed to adjust the hearing assistance device output to a wearer's particular hearing impairment. The processor may be a digital signal processor (DSP), microprocessor, microcontroller, other digital logic, or combinations thereof. The processing may be done by a single operatively connected processor, or may be distributed over different devices. The processing of signals referenced in this application may be performed using the processor or over different devices. Processing may be done in the digital domain, the analog domain, or combinations thereof. Processing may be done using subband processing techniques. Processing may be done using frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, buffering, and certain types of filtering and processing. In various embodiments of the present subject matter the processor is adapted to perform instructions stored in one or more memories, which may or may not be explicitly shown. Various types of memory may be used, including volatile and nonvolatile forms of memory. In various embodiments, the processor or other processing devices execute instructions to perform a number of signal processing tasks. Such embodiments may include analog components in communication with the processor to perform signal processing tasks, such as sound reception by a microphone, or playing of sound using a receiver (i.e., in applications where such transducers are used). In various embodiments of the present subject matter, different realizations of the block diagrams, circuits, and processes set forth herein may be created by one of skill in the art without departing from the scope of the present subject matter.

It is further understood that different hearing assistance devices may embody the present subject matter without departing from the scope of the present disclosure. The devices depicted in the figures are intended to demonstrate the subject matter, but not necessarily in a limited, exhaustive, or exclusive sense. It is also understood that the present subject matter may be used with a device designed for use in the right ear or the left ear or both ears of the wearer.

The present subject matter is demonstrated for hearing assistance devices, including but not limited to, behind-the-ear (BTE), in-the-ear (ITE), in-the-canal (ITC), receiver-in-canal (RIC), invisible-in-canal (IIC) or completely-in-the-canal (CIC) type hearing assistance devices, or cochlear implants, cochlear implant magnets, cochlear implant processors, bone-conduction or other osseointegrated devices. It is understood that behind-the-ear type hearing assistance devices may include devices that reside substantially behind the ear or over the ear. Such devices may include hearing assistance devices with receivers associated with the electronics portion of the behind-the-ear device, or hearing assistance devices of the type having receivers in the ear canal of the user, including but not limited to receiver-in-canal (RIC) or receiver-in-the-ear (RITE) designs. The present subject matter may also be used in hearing assistance devices generally, such as cochlear implant type hearing devices. The present subject matter may also be used in deep insertion devices having a transducer, such as a receiver or microphone. The present subject matter may be used in devices whether such devices are standard or custom fit and whether they provide an open or an occlusive design. It is understood that other hearing assistance devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A hearing assistance system, comprising:

a microphone configured to receive an acoustic input;

a magnetic sensor configured to receive an inductive input;

a memory;

a processor operatively connected to the microphone, the magnetic sensor, and the memory, wherein the processor is configured to process the acoustic input from the microphone using instructions stored in a first set of memory locations and further configured to process the inductive input from the magnetic sensor using instructions stored in a second set of memory locations; and a demodulator circuit operatively connected to the processor, the demodulator circuit configured to detect a predetermined signal embedded in one or more of the acoustic input or the inductive input, wherein the processor is configured to switch from using instructions stored in the first set of memory locations to using instructions stored in the second set of memory locations when the demodulator circuit detects the predetermined signal.

2. The system of claim 1, wherein the predetermined signal is received from a hearing loop system.

3. The system of claim 2, wherein the predetermined signal is received from a beacon device in or near the hearing loop system.

4. The system of claim 3, wherein the beacon device includes one or more of a wireless beacon device, an acoustic beacon device, an infrared beacon device or a magnetic beacon device.

5. The system of claim 1, wherein the predetermined signal includes one or more of a code, a key, a pattern, a digital signature, a modulated signal, a characteristic of speech or a characteristic of music.

6. The system of claim 1, wherein the predetermined signal is embedded into an audio signal, embedded into an inductive signal, or is embedded into an out-of-band signal.

7. The system of claim 1, wherein the predetermined signal includes a signal at a frequency or amplitude outside a range of human hearing.

8. The system of claim 1, wherein the demodulator circuit is configured to periodically attempt to detect the predetermined signal, to reduce power and preserve system resources.

9. The system of claim 8, wherein the demodulator circuit is configured to temporarily switch off the microphone and switch on the telecoil to detect the predetermined signal.

10. The system of claim 1, wherein the system includes wirelessly-linked left and right hearing devices, and wherein the system is configured to duty cycle between the wirelessly-linked left and right hearing devices to attempt to detect the predetermined signal.

11. The system of claim 10, wherein the wirelessly-linked left and right hearing devices are configured to make coordinated adjustments to one or more hearing assistance parameters for consistent user experience.

12. The system of claim 1, wherein the hearing assistance system is in communication with a smartphone of a user of the hearing assistance system, and wherein at least some processing of the system is offloaded to a processor of the smartphone.

13. The system of claim 1, wherein the magnetic sensor includes one or more of a telecoil, a giant magnetoresistance (GMR) sensor, or a tunnel magnetoresistance (TMR) sensor.

14. The system of claim 1, wherein, when switching from using instructions stored in the first set of memory locations to using instructions stored in the second set of memory locations, the processor is configured to activate an auto-vent feature to close off a vent of a device of the hearing assistance system to provide acoustic separation from ambient sounds.

15. A method of using a hearing assistance system, comprising:

receiving an acoustic input at a microphone of the hearing assistance system;

receiving an inductive input at a magnetic sensor of the hearing assistance system;

using a processor of the hearing assistance system to process the acoustic input from the microphone using instructions stored in a first set of memory locations; and using the processor of the hearing assistance system to process the inductive input from the magnetic sensor using instructions stored in a second set of memory locations, and to optionally discontinue processing the acoustic input when a demodulator circuit operatively connected to the processor detects a predetermined signal embedded in one or more of the acoustic input or the inductive input, the predetermined signal indicative of the presence of a hearing loop system.

16. The method of claim 15, further comprising:

sensing a user input; and upon sensing the user input, switching from processing the inductive input using instructions stored in the second set of memory locations to processing the acoustic input using instructions stored in the first set of memory locations.

17. The method of claim 16, wherein the user input is received using a manual switch on a housing of a device of the hearing assistance system.

18. The method of claim 16, wherein the user input is received as a gesture input from a wearer of a device of the hearing assistance system.

19. The method of claim 15, further comprising:

using a global positioning system (GPS) to determine whether the hearing assistance system is proximate the hearing loop system; and switching from processing the acoustic input using instructions stored in the first set of memory locations to processing the inductive input using instructions stored in the second set of memory locations based on the determination.

20. The method of claim 19, further comprising using a machine learning system to determine whether the hearing assistance system is proximate the hearing loop system.

21. The method of claim 15, further comprising:

determining an orientation of a device of the hearing assistance system using an inertial measurement unit (IMU) sensor; and providing a message to a wearer of the device directing the wearer to change the orientation of the device in a prescribed manner to improve reception of the inductive input.

22. The method of claim 21, further comprising:

determining statistics related to loudness of one or more of an input signal or an output signal of the hearing assistance system; and adjusting parameters of the hearing assistance system when processing the inductive input from the telecoil to match the determined statistics.

23. The method of claim 22, wherein determining the statistics related to loudness includes targeting harmonics of a voice of a speaker in an acoustic environment of the wearer.

* * * * *